United States Patent [19]

Wilson et al.

[11] 4,040,496

[45] Aug. 9, 1977

[54] AUTOMATIC WEIGHING MACHINES

[75] Inventors: Thomas William Wilson, Bramhall; Michael Johnston Topham, Sale, both of England

[73] Assignee: Tootal Limited, Manchester, England

[21] Appl. No.: 584,842

[22] Filed: June 9, 1975

[30] Foreign Application Priority Data

June 18, 1974 United Kingdom .............. 26862/74

[51] Int. Cl.[2] .............................................. G01G 13/04

[52] U.S. Cl. .................................... 177/105; 177/122; 251/205

[58] Field of Search ................. 177/61, 105, 116, 117, 177/118, 119, 122, 123, 163; 251/205

[56] References Cited

U.S. PATENT DOCUMENTS

| | | | |
|---|---|---|---|
| 924,940 | 6/1909 | Rough | 177/61 |
| 2,763,457 | 9/1956 | Gregory | 177/117 |
| 2,829,856 | 4/1958 | Gregory | 177/122 |
| 3,106,974 | 10/1963 | Williams | 177/70 |

FOREIGN PATENT DOCUMENTS

| | | |
|---|---|---|
| 1,338,143 | 11/1973 | United Kingdom |

*Primary Examiner*—Joseph W. Hartary

*Attorney, Agent, or Firm*—Cushman, Darby & Cushman

[57] ABSTRACT

The invention provides an automatic weighing machine for weighing out a predetermined quantity of fluid materials into a container. The machine includes a fluid material valve of the downward delivery type comprising a closure member having a plurality of selectable positions corresponding to different flow rates through the valve. A weighing control system is adapted to control the valve so as to dispense an appropriate weight of fluid material into the container in accordance with a predetermined program. The control system comprises one or more load cells arranged to provide an electrical output dependent upon the weight of the container plus its contents, and a comparator for comparing the signal from the load cell or cells with a predetermined target weight to be achieved in accordance with the program whereby to provide an electrical error signal instantaneously representative of the additional weight of fluid material to be dispensed. A control means sequentially adjusts the valve to lower flow rate positions in dependence upon both the magnitude of the error and the rate of change of the error.

10 Claims, 5 Drawing Figures

38
36
34
40
20
2
18
22
16
6
4
10
8
28
26
24
16
32
32a
32b
14
13
12 dEx
dt
128
V1
132
0v
126
Ex
V2
136
-V
130
134
138
140

54
START OF WEIGHING
78
PRINT
56
COLOUR VALVE
WEIGHING CONTROL SYSTEM
58
76
68
CARD READER
70
DIGITAL TO ANALOGUE CONVERTER
72
TARGET LEVEL
STAGE
66
SAMPLE AND HOLD
64
74
ERROR AMPLIFIER
CONTAINER
60
LOAD CELLS AMPLIFIER
62
75
DIGITAL VOLT METER

41
SEQUENCE STAGE
STEP TO NEXT STAGE
43
42
START OF STAGE ROUTINE
44
TROLLEY MOVEMENT
50
WEIGHT ADDITION
52
PRINT OUT
48
TRACK POSITION
46
CARD READER

AUTOMATIC WEIGHING MACHINES

The present invention is concerned with automatic weighing machines.

A primary object of the invention is to provide a machine which will automatically dispense a predetermined weight of fluid material.

A secondary object is to provide a machine which will automatically dispense predetermined weights of two or more different fluid materials to achieve a predetermined mixture of such materials.

In accordance with the present invention, an automatic weighing machine for weighing out a predetermined quantity of fluid material into a container includes a fluid material valve of the downward delivery type comprising a closure member having a plurality of selectable positions corresponding to different flow rates through the valve, and a weighing control system which is adapted to control the valve so as to dispense an appropriate weight of fluid material into the container in accordance with a predetermined programme, the control system comprising one or more load cells arranged to provide an electrical output dependent upon the weight of the container plus its contents, and a comparator for comparing the signal from the load cell or cells with a predetermined target weight to be achieved in accordance with the programme whereby to provide an electrical error signal instantaneously representative of the additional weight of fluid material to be dispensed, and means responsive to the error signal for sequentially adjusting the valve to lower flow rate positions as the error reduces.

The invention is described further hereinafter, by way of example, with reference to the accompanying drawings, in which.

Figure 1:
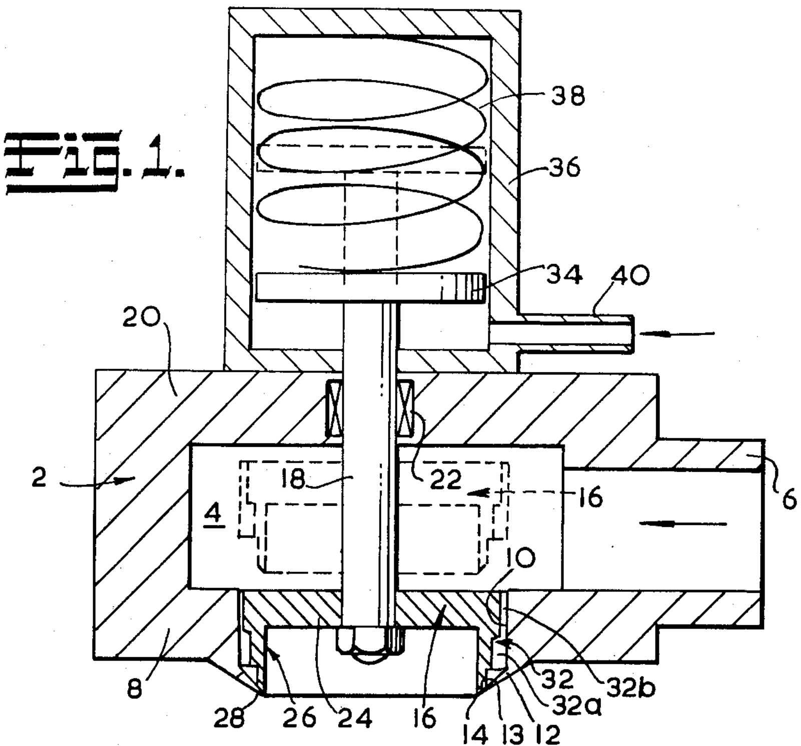
FIG. 1 is a diagrammatic sectional side elevation of one embodiment of a colour dispensing valve for a system in accordance with the invention.

The apparatus diagrammatically illustrated in the accompanying drawings is designed to weigh out a predetermined quantity or quantities of fluid material, and is internally programmed to carry out a sequence of operations which results in a container being automatically, sequentially transported to an appropriate one or more of a plurality of fluid material dispensing stations in accordance with a predetermined programme, and an appropriate weight of fluid material being dispensed into the container at the or each station in accordance with that programme.

Although the material to be dispensed could be almost any flowable substance, the following description is concerned with the dispensing of liquid colours (dyes) for use in textile printing processes wherein it is required to mix together predetermined quantities of different liquid dyes to arrive at a required colour.

The sequence which the apparatus performs has a plurality of stages, in this instance eight, and at each stage the apparatus performs a corresponding routine. At least the intermediate routines usually include the actions of transporting a container, such as an open-topped tub, to a dispensing station, adding a specific quantity of fluid to the container and printing out the weight and information concerning and identifying that station. However, the routines vary, at least for the first and last stages, as described below.

Although not illustrated in detail, the apparatus generally comprises a plurality of fluid dispensing valves, in this instance six, which are of the general type described in prior British Patent Specification No. 1,338,143 (see below) and which are located at respective filling stations. A trolley is selectably displaceable on tracks for transporting a container sequentially to the appropriate stations for the particular colour mixture to be produced, the container being supported on a weighing device on the trolley which provides electrical information indicative of the weight of the container plus its contents. Conveniently, the weighing device comprises a number of load cells, preferably three, which provide electrical signals proportional to the applied load. An amplifier enables a voltage swing of about 10 volts to be obtained for 100 Kgm load. The amplified output of the weighing device is arranged to be compared with a target level presented by the programme in order to provide an error signal for controlling the actuation of the colour valve at that dispensing station. The control system which operates on the error signal to actuate the colour valves is described in detail below.

Advantageously, the trolley is self powered, i.e. it does not require connecting cables to a stationary drive. This is achieved by providing batteries on the trolley which are arranged to be automatically recharged at the end of each sequence when the trolley returns to a terminal position. Information as to the instantaneous position of the trolley is derived digitally from magnets placed alongside the track.

The apparatus further includes a punched card reader for reading and decoding the programme instructions contained on individual cards, each card containing the instructions and information corresponding to one particular colour mix which can be prepared by the apparatus. Thus, to obtain any particular colour mix it is merely necessary to insert the appropriate card into the reader.

A printer, having memory facilities, is included for printing out information concerning, for example, the weight added at any particular station and the details of that station, as described further below. Continuous monitoring of the weight registered by the load cells is given by a digital volt meter.

An example of one of the individual fluid valves located at each dispensing station is described further hereinafter with reference to FIG. 1. The illustrated valve is essentially the same as that described in British Patent Specification No. 1,338,143 but differs in that it has selectable, distinct valve positions corresponding to three specific flow rates, compared with the valve of the prior specification which has only two.

The liquid valve of FIG. 1 comprises a housing 2 defining a chamber 4 which communicates via an input passage 6 with a source of fluid to be dispensed (not shown). The base 8 of the chamber bears a vertically orientated through-bore 10 forming an outlet passage of the valve, the majority of the bore 10 being cylindrical but the lower end of the bore bearing an inwardly directed lip which forms a valve seat 13 of inverted frusto-conical configuration. The underside of the valve seat is also of inverted frusto-conical configuration so that it is sharply cut-away to form a generally downwardly directed sharp circular edge 14.

The valve further includes a closure member 16 which is mounted for vertical movement on a rod 18 which passes through the upper wall 20 of the chamber 4 via a sealing gland indicated diagrammatically at 22. The closure member 16 is of inverted cup-shaped configuration, having a base portion 24 and a cylindrical side wall 26 dimensioned such that the side wall is a close sliding fit in the cylindrical portion of the outlet bore 10. The lower end of the cylindrical wall 26 of the closure member is formed with a complementary frusto-conical closure surface 28 which is adapted to mate with the surface of the frusto-conical valve seat 13 when the valve is in its fully closed (OFF) condition.

In order for the valve to be capable of providing three distinct flow rates, the cylindrical side wall 26 of the closure member 16 has a plurality of axially extending slots 32, the depth of which changes abruptly at approximately a mid-length position such that the lower portions **32*a* of the slots have a greater depth than the upper portions 32*b*. Thus, when the closure member 16 is fully withdrawn from the bore 10 (as indicated in dashed lines in FIG. 1), the flow of fluid through the outlet is substantially unimpeded and a high flow rate (referred to as FLOOD rate) is achieved. When however, the closure member 16 is partially introduced into the bore 10 to assume a second position such that the lower portions 32*a* of the slots, having greater depth, lie within the bore 10 but the upper portions 32*b*, having smaller depth, lie well outside the bore 10, fluid can flow to the outlet via the deeper slot portions 32*a* and an intermediate flow rate is achieved (referred to as DRIBBLE rate). When the closure member 16 is introduced further into the bore 18 to a third position such that the upper, shallower portions 32*b* of the slots lie within the bore 10 but the frusto-conical surface 28 is still clear of the valve seat 13, fluid can flow to the outlet via the shallower slot portions 32*b*** so that a low flow rate is achieved (referred to as DRIP rate).

In order to enable the closure member 16 to be selectably moved to its four positions, corresponding to fully open (FLOOD), DRIBBLE, DRIP and fully closed (OFF), the rod 18 carrying the closure member 16 is attached to a piston 34 slidably mounted within a cylinder 36 and biassed downwardly by a helical coil spring 38 to a normal position in which the valve is OFF. As described further hereinafter, the control system for the weighing device is arranged to provide an adjustable air pressure to the underside of the piston 34 via an inlet line 40, the air pressure having three distinct values which can be selected by the control system to bring the closure member 16 into its three above mentioned positions, respectively. Thus, an absence of pressure leaves the piston 34 under the control of the spring 38 alone; a first, low pressure is able to displace the piston 34 against the spring 38 sufficiently far to achieve the DRIP condition; a second, higher pressure is able to displace the piston 34 further to bring the closure member 16 into the DRIBBLE condition; and a third, still higher pressure is able to displace the closure member 16 completely out of the bore 10 so as to achieve the FLOOD condition.

Returning now to the description of the overall operation of the apparatus, at each stage a section of punched card, or other programme carrying means, is scanned, the information on the card being arranged to determine at what station the container should stop and how much additional weight of liquid is to be added thereto.

Before the apparatus can be started on its sequence, a number of conditions must be met, namely:

1. A container of suitable size must be on the platform of the weighing device.
2. A card must be in the reader and the reader must be correctly reading the information concerned with the "total weight".
3. There must be no "fault" condition in any system.

When all three of the aforegoing conditions have been met, a start button lights up and, if pressed, the apparatus steps to the first of the eight stages of its sequence.

The first stage is concerned principally with establishing and recording the tare weight of the container, that is, the empty weight of the container before any material has been added thereto. In addition, however, the card reader is energised to read the information on the card corresponding to the manufacturing job in hand, i.e. the Order Number of the job, the Way Number of the job, the Pitch Number of the job, and the like, this information being taken from the card and printed out by the printer. The tare weight is measured by the load cells on the trolley and printed out by the printer. The apparatus then steps to the second stage.

The routines effected at the second stage are as follows:

1. The first station at which the container is to be stopped and the weight to be added at that station are identified from the card by the reader.
2. Movement of the trolley along the track is initiated.
3. At the station before the one required, the trolley is slowed down and then brought to a halt at the required station.
4. The colour valve at that station is opened and then closed in stages to dispense the desired amount of colour fluid. The control system which achieves the dispensing of the correct amount of fluid to close tolerances is described in detail hereinafter.
5. The printer provides a print-out of how much fluid has been added, how much should have been added, what the station should have been (i.e. which one) and which it actually was.
6. If the added weight is inside the tolerance limits, the apparatus proceeds to the next stage; if not, a fault condition appears which has to be cleared before the apparatus will proceed.

The third, fourth and all stages except the last are identical to the second stage but are concerned with the weight addition to be made at each of the other dispensing stations, respectively. Clearly, in some cases, some of the dispensing stations may not be required to dispense fluid in which case that station is passed and the next stage activated. The number of stations, and hence the number of stages, is optional, the eight described in the present instance being intended to be by way of example only.

The last stage, in this case the eighth, includes the following routines:

1. The last section of the card reader is energised which contains the total net weight which should have been added by the various stations.

2. The trolley is returned to its terminal position where it is automatically coupled to a battery charger.

3. The memory is recalled and a print-out made of the actual net load in the container for comparison with the total net weight as given by the reader.

4. Finally, the paper tape emanating from the printer is advanced ready for tearing off and a batch counter is advanced by one.

Figure 2:
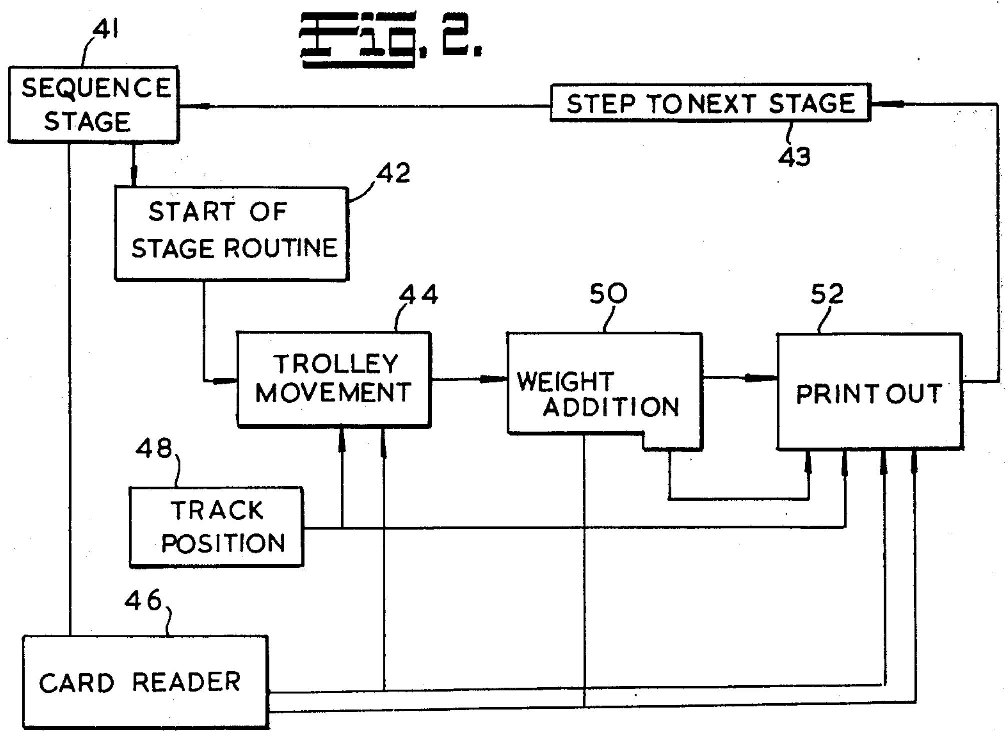
FIG. 2 is an explanatory block diagram of one single routine of the sequence performed by the colour dispensing apparatus.

The aforegoing stages 2 to 7 are illustrated diagrammatically in block form in FIG. 2. The "Start of Stage Routine" 42 is initiated by the "Sequence Stage" 41 being stepped by a unit 43 to the next stage. The "Trolley Movement" 44 displaces the trolley until the position of the trolley on the track corresponds to that read by the card reader 46, the "Track Position" 48 providing digital information derived from the magnets along the track indicative of the location of the trolley. The "Weight Addition" 50 performs a closed loop weighing operation initiated by the trolley stopping at its correct station. The "print-out" unit 52 provides a record of all information concerned with trolley weight and amounts added, at the end of each weight addition.

Figure 3:
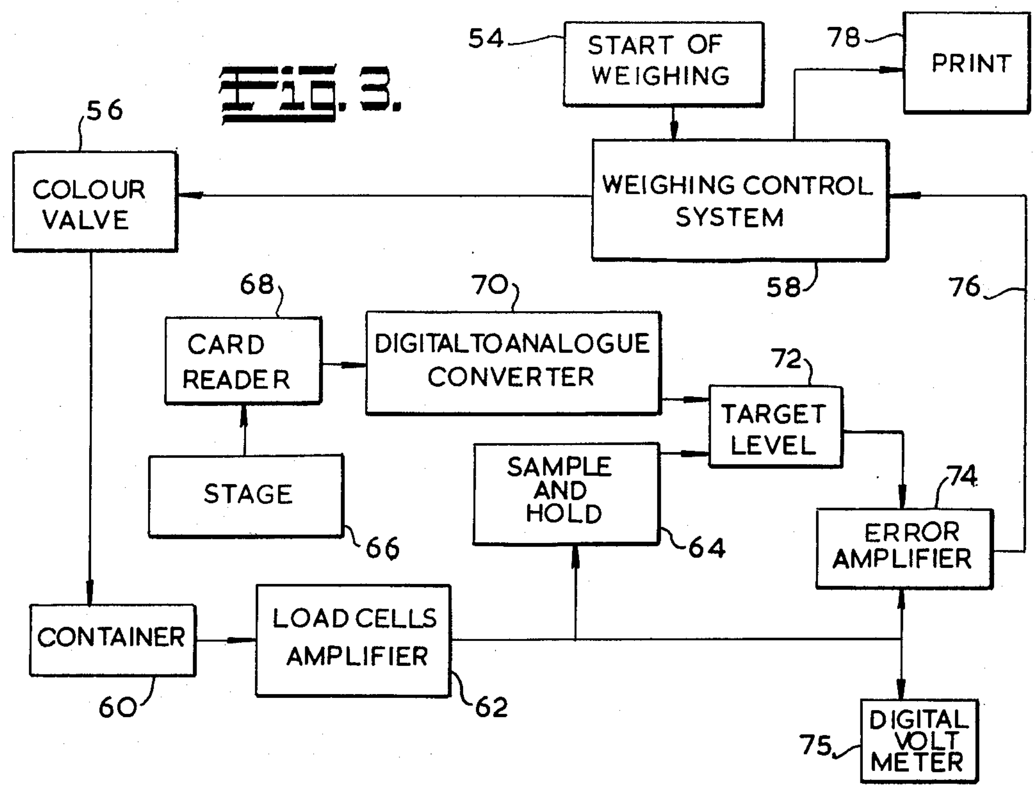
FIG. 3 is an explanatory block diagram of the operations effected by the system during the addition of colour fluid to the container at one of the dispensing stations.

The "weight addition" block 50 of FIG. 2 is illustrated diagrammatically, but in more detail, with reference to FIG. 3. The "Start of Weighing" block 54 initiates a weighing operation upon the trolley reaching its destination to place the container beneath a selected colour valve 56, of the type shown in FIG. 1. The opening and closing of the colour valve 56 is controlled by a "Weighing Control System" 58 which is described in detail below with reference to FIGS. 4 and 5. The container 60 carried by the trolley and located beneath the colour valve 56 is continuously weighed by the load cells on the trolley, the output of the load cells being amplified in the "Load Cells Amplifier" 62, which is temperature and thermally compensated and provides an output of 10.000 volts for a load of 100.0 Kgm. Signals corresponding to the previous weight addition, or tare weight, are stored in a "Sample and Hold" unit 64 until commanded to sample the new level.

The "Stage" unit 66 controls which section of the card is to be read by the "Card Reader" 68, the latter providing, in this embodiment, 4 decade digits of 16 B.C.D. digits of required weight. An "Analogue to Digitial Converter" 70 changes the card digits to an analogue voltage which is added to the voltage from the "Sample and Hold" unit 64 corresponding to the previous actual weight, in a "Target Level" unit 72 to provide a signal corresponding to the total weight which is required at the end of the next weighing operation. The output of the load cells amplifier 62 is compared with the target level signal in an "Error Amplifier" 74 to provide an error signal on line 76 which is supplied to the weighing control system 58 for the purpose of controlling the degree of opening of the colour valve and hence the amount and rate of flow of colour fluid to the container. The "Print" unit 78 provides a record of the action of the weighing control system as soon as the valve 56 is completely closed (OFF).

Figure 4:
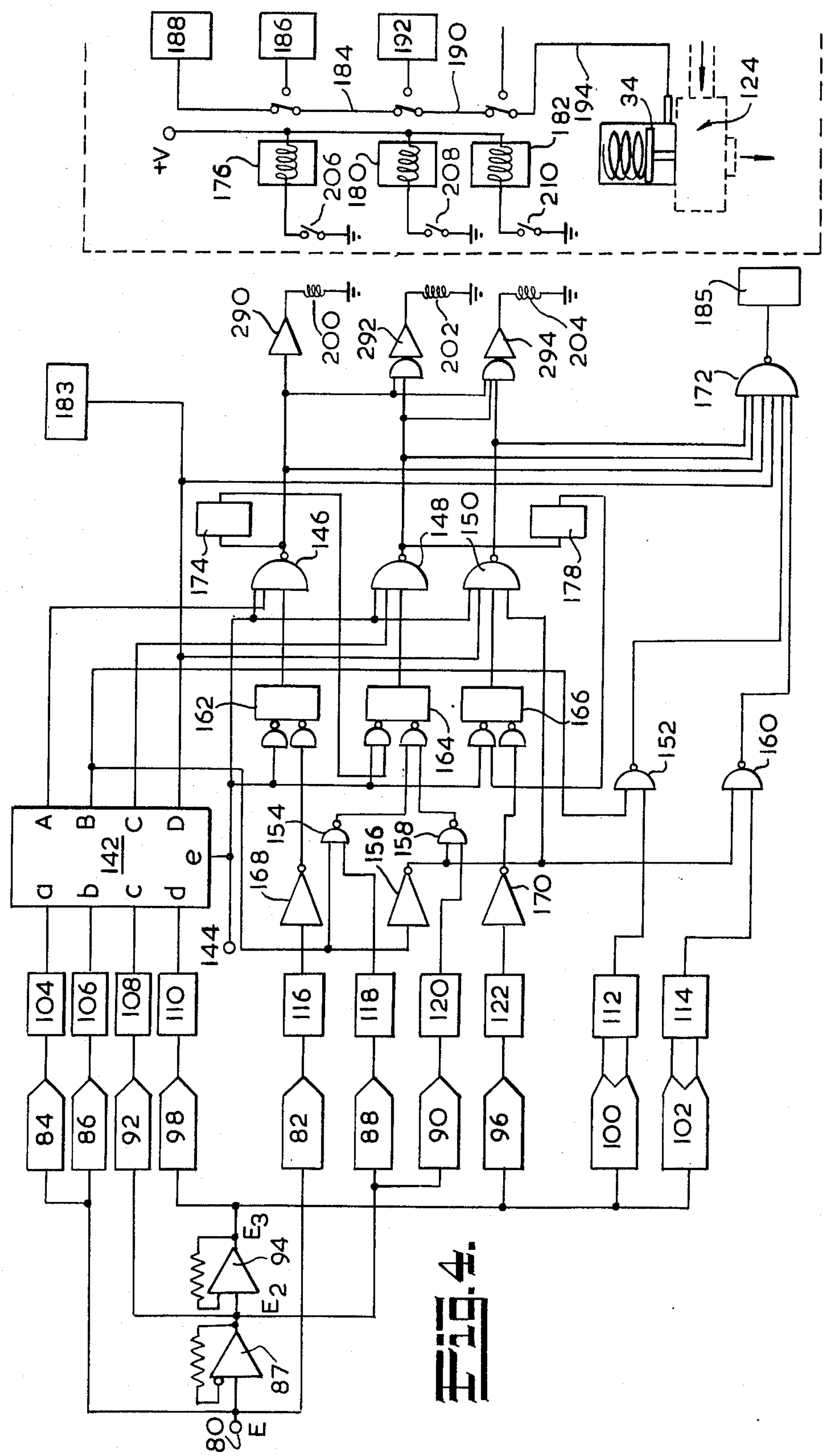
FIG. 4 is a circuit diagram, partially in block form, of one embodiment of a weighing control system.

The "Weighing Control System" 58 of FIG. 3 is now described in detail with reference to FIGS. 4 and 5.

The error signal E from the error amplifier 74 of FIG. 3, which of course is initially equal to the total weight to be added by the particular valve concerned, is applied to the input terminal 80 from whence it is coupled to the input of a first dynamic detector 82 and to the inputs of first and second level detectors 84,86. In this particular embodiment, the error signal E is arranged to lie between 0 and ± 12 volts and represents a weight differential of 0 to ± 6 Kgm.

The error signal E is also applied to the input of a first amplifier 87 having a gain of 12 which produces a second error signal $E_2$ having the same voltage range of 0 to ± 12 volts but which now represents a weight error of 0 to ± 500 gm. The second error signal $E_2$ is applied to the inputs of second and third dynamic detectors 88, 90 and to the input of a third level detector 92.

The error signal $E_2$ is also applied to the input of a second amplifier 94 having a gain of 12 which produces a third error signal $E_3$ having the same voltage range of 0 to ± 12 volts but which now represents a weight error of 0 to ± 45 gm approximately. The third error signal $E_3$ is applied to the input of a fourth dynamic detector 96, to the input of a fourth level detector 98 and to the inputs of first and second differential level detectors 100 and 102.

The level detectors 84, 86, 92 and 98 are pre-set to trip at voltages equivalent to 3 Kgm, 1 Kgm, 250 gm and 40 gm, respectively, which in this case correspond to 6v, 2v, 6v and 11.75 respectively. The outputs so obtained are interfaced in interface elements 104, 106, 108 and 110 respectively to make them compatible with the subsequently encountered logic circuit, described further below and such that a low level of error produces a "0" output.

The differential level detectors 100, 102, interfaced at 112, 114, are constructed to detect when the error lies within predetermined ranges, the detector 100 producing a "0" when the error is less than ± 20 gm (± 5.8v) and the detector 102 producing a 0 when the error is less than ± 3 gm (± 0.9v).

Figure 5:
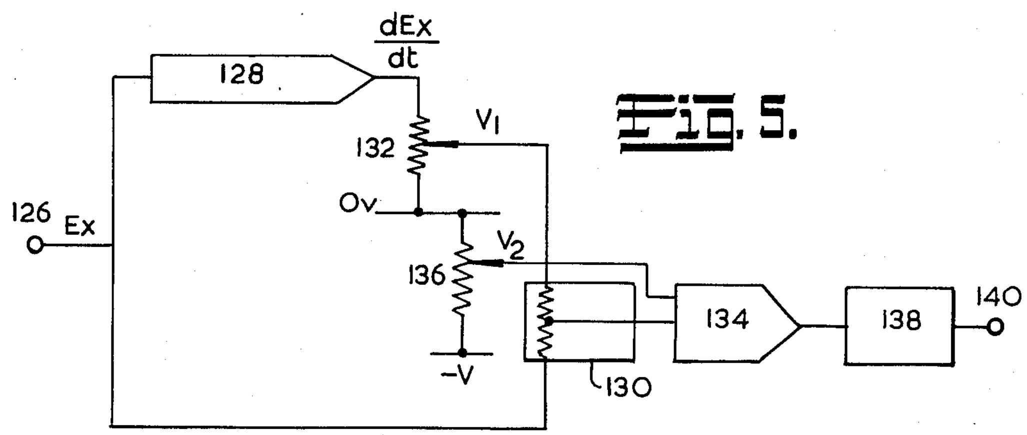
FIG. 5 is a circuit diagram, partially in block form, of one of the dynamic detector elements of the system of FIG. 4.

The dynamic detectors 82, 88, 90 and 96, which are interfaced at 116, 118, 120 and 122 respectively, are all identical, one such detector being illustrated in detail in FIG. 5. The dynamic detectors are adapted to control the degree of opening of the valve, illustrated diagrammatically at 124 in FIG. 4, in accordance with both the magnitude of the instantaneous error and the rate of change of the error, the detectors being arranged such that a corresponding one of their outputs changes from 0 to 1 when the valve 124 is required to close to its next degree of opening.

With reference to FIG. 5, the input 126 of each dynamic detector is connected both to the input of a differentiator 128 and to one input of a summing device 130 which, in the present case, is simply a pair of series resistors, the junction of which provides a summed output. The error signal $E_\chi$ is applied to input 126 and hence to the differentiator 128 whose output is thus a voltage proportional to the rate of change ($dE_\chi/dt$) of the error E. A proportion $V_1$ of the latter voltage is picked off by means of a potentiometer 132 and applied to the other input of the summing device 130. The output of the summing device is applied to one input of a level detector 134 whose other input is connected to a pre-set negative voltage $V_2$ obtained from a further potentiometer 136. The output of the level detector is interfaced at 138 to provide an output at terminal 140. This circuit operates as follows.

For a given degree of opening of the valve corresponding to one of its flow positions (i.e. FLOOD, DRIBBLE or DRIP), a substantially constant rate of change of error is obtained so that a substantially steady, positive voltage $V_1$ is picked up at the potentiometer 132 and applied to the second input of the summing element 130. The error signal $E_\chi$ is arranged to start at a high negative level and to approach zero as the error becomes less. The negative voltage $V_2$ picked off by the potentiometer is typically less than 1 volt, the level detector 134 being arranged to change over from 0 to 1 when its two inputs are equal. Thus, for example, if the voltage $V_1$ is +2 volts and the voltage $V_2$ is −0.5 volts, the level detector will switch over when the error signal $E_\chi$ falls to −2.5 volts, that is, before the error actually reaches zero.

The purpose of making the system respond prematurely in this manner is primarily to take account of the finite response time of the mechanical parts of the system, in particular the time taken for the valve to react to its controlling signals and to arrive at its next state. The system is thus designed to "anticipate" the error reaching zero and to initiate the change-over of the valve so that this change-over does in fact occur when the error is substantially zero, the change-over point being initiated further from zero-error, the greater the rate of flow.

Since the reaction time of the mechanical parts of the system cannot be predetermined and must vary from apparatus to apparatus, the particular value of the offset voltage $V_2$ necessary to achieve the correct "anticipation" must be discovered by trial and error but, once set, remains constant for future operation of the apparatus. The offset voltage $V_2$ is usually greater for those dynamic detectors concerned with change from one rate of flow to the next, and smaller for those detectors which determine the final cut-off point.

For the errors quoted above, and a maximum FLOOD rate of 6 Kgm/second (12v. per second), the output of the differentiator 128 is preferably 1 volt for every 1 volt/second rate of change on the input, a suitable proportion of the output being selected by a process of trial and error to suit the particular apparatus, by the setting of the potentiometer 132.

Returning to FIG. 4, the interfaced outputs of the level detectors, which are used for programming purposes, are supplied to four inputs *a, b, c, d* of a Sample and Hold unit 142 which retains on its outputs A, B, C, D whatever levels appeared on *a, b, c* and *d* respectively when a "command to weigh" signal (1) appears at a second input *e* from a terminal 144.

The output A is connected to one input of a first NAND gate 146. The output C is connected to one input of a second NAND gate 148 and the output D is connected to one input of a third NAND gate 150. The output B is connected to one input of a fourth NAND gate 152, to a first input of a fifth NAND gate 154 and to the input of a first inverter 156 whose output is connected to one input of a sixth NAND gate 158, to a second input of the third NAND gate 150 and to a first input of a seventh NAND gate 160. The terminal 144 is additionally connected to second inputs of the first, second and third NAND gates 146, 148 and 150, and to first SET inputs of three bistables 162,164 and 166.

The interfaced output of the dynamic detector 82 is connected to a RESET input of bistable 162 via a second inverter 168; the output of the dynamic detector 88 is connected to a second input of the NAND gate 154; the output of the dynamic detector 90 is connected to a second input of the NAND gate 158; and the output of the dynamic detector 96 is connected to a RESET input of the bistable 166 via a third inverter 170.

The interfaced outputs of the differential level detectors 100,102 are respectively connected to second inputs of the NAND gates 152,160, the outputs of which are connected to first and second inputs of an eighth NAND gate 172.

The outputs of the fifth and sixth NAND gates 154,158 are connected to first and second RESET inputs of the bistable 164, the output of which is connected to a third input of the second NAND gate 148. The output of the first NAND gate is connected firstly to the input of a one-shot multivibrator 174 whose output is connected to a second SET input of the bistable 164; secondly, to a third input of the NAND gate 172; and, thirdly to a first buffer amplifier 190 controlling the actuation of a first solenoid operable pneumatic valve 176. The output of the second NAND gate 148 is connected firstly to one input of a second one-shot multivibrator 178 whose output is connected to a second SET input of the bistable 166; secondly, to a fourth input of the NAND gate 172; and, thirdly, to an AND input of a second buffer amplifier 192 controlling the actuation of a second solenoid operable pneumatic valve 180. The output of the third NAND gate 150 is connected to a fifth input of the NAND gate 172 and to an AND input of a third buffer amplifier 194 controlling the actuation of a third solenoid operable pneumatic valve 182. The outputs of the bistables 162,166 are respectively connected to third and fourth inputs of the first and third NAND gates 146,150.

The output of the first NAND gate 146 is also connected to second AND inputs of the buffer amplifiers 192 and 194, so ensuring that when a 0 appears at the output of NAND gate 146, solenoid operated valves 176,180 and 182 are all energised.

The output of the second NAND gate 148 is also connected to a third AND input of the buffer amplifier 194, so ensuring that when a "0" appears at the output of the NAND gate 148, the solenoid operated valves 180 and 182 are both energised.

Apart from the solenoid valves 176, 180 and 182 the component parts of the "weighing control system" so far described are all mounted on the movable trolley which carries the container to, and between, the various dispensing stations. On the other hand, the solenoid valves 176,180,182 are provided for controlling the flow state of a single valve 124 at a particular dispensing station. There is thus a set of solenoid valves 176,180,182 located at each dispensing station and associated with the valve 124 at that station. Means must therefore be provided for operably coupling the control signals from the amplifiers 190,192 and 194 on the movable trolley to the appropriate fixed valves 176,180 and 182 at any particular dispensing station where the trolley is halted.

This coupling can clearly be accomplished in many ways, for example electromagnetically or mechanically. In the embodiment described, the coupling is achieved electromagnetically by connecting the outputs of the amplifiers 190,192 and 194 to one end of solenoids 200,202,204 respectively, whose other ends are earthed. Each dispensing station includes three sets of reed switch contacts 206,208,210 located at positions such that they lie adjacent the solenoids 200,202,204, respectively, when the trolley is located at that station. One side of each set of contacts 206,208,210 is earthed and the other side is connected to one end of the solenoids of the valves 176,180 and 182, respectively. The other ends of the solenoids of the valves 176,180,182 are connected to a voltage source V whereby the valves 176,180,182 are effectively subjected to a 0 when the reed switch contacts 206,208,210 are open and to a 1 when the latter contacts are closed. Thus, the solenoid valve 176 is actuated when a signal is applied to the solenoid 200 to close the reed switch contacts 206. Likewise, the solenoid valves 180 and 182 are actuated when signals are applied to the solenoids 202,204 to respectively close the reed switch contacts 208,210.

The output D is additionally connected to a sixth input of the NAND gate 172 and also to an alarm unit 183. Finally, the output of the NAND gate 172 is connected to a unit 185 controlling the termination of weighing upon receipt of a 0 output from the latter NAND gate 172.

The solenoid operable pneumatic valves 176,180 and 182 control a pneumatic circuit by means of which the piston of the colour valve 124 can be subjected to four different and distinct pressures. The valve 176 is adapted to connect a pneumatic line 184 either to a source of relatively high pressure 188 or a source of medium pressure 186, the arrangement being such that the connection is to the medium pressure source 186 when a 1 signal appears on the output of the NAND gate 146. The valve 180 is adapted to connect a pneumatic line 190 either to the line 184 or to a source of low pressure 192, the arrangement being such that the connection to the source 192 is made when a 1 signal appears on the output of the NAND gate 148. The valve 182 is adapted to connect a pneumatic line 194, connected to the inlet 40 of the cylinder on the valve 124, either to the line 190 or to atmosphere, the connection to atmosphere being arranged to be made when a 1 signal appears on the output of the NAND gate 150. Conversely, when a 0 signal is applied to the valves 176,180,182, the line 184 is connected to the high pressure source 188, the line 190 is connected to the line 184 and the line 194 is connected to the line 190 by the three pneumatic switches, respectively. The valves are shown in the latter state in FIG. 4.

The FLOOD condition is thus only obtained when a 0 signal is applied to all three valves 176,180 and 182. The DRIBBLE condition is obtained when a 1 is applied to valve 176 but a 0 is applied to both valves 180 and 182. The DRIP condition is obtained when a 1 signal is applied to the valves 176 and 180 but a 0 is applied to the valve 182. The OFF condition is obtained when a 1 signal is applied to all three valves 176, 180 and 182.

The aforegoing control system operates as follows.

Prior to weighing, a 0 state exists on the terminal 144 so that the Sample and Hold unit 142 samples but does not hold. The bistables 162,164 and 166 are arranged to be set, with 1 outputs. NAND gates 146,148 and 150 are closed and a 1 signal appears at their outputs causing the valve 124 to be OFF.

A weighing operation is initiated by the application of a 1 signal to the terminal 144, the unit 142 then permanently holding the prevailing levels on A, B, C and D for the duration of the weighing operation. Bistables 162,164,166 remain in their previous state, but the NAND gates 146,148,150 are released, unless otherwise inhibited, and allow a 0 to appear on their outputs so actuating the valves 176, 180 and 182 to achieve the FLOOD condition. Initially, the outputs of the dynamic detectors 82, 88, 90 and 96 are all 0. However, when these progressively change to 1 as the error reduces, the bistables 162, 164 and 166 are correspondingly tripped so that a 0 appears on their outputs. The NAND gates 146, 148, 150 are then closed and 1 signals appear on their outputs to progressively inhibit FLOOD, DRIBBLE and DRIP, a 1 signal on the valve 176 controlling FLOOD to DRIBBLE, a 1 signal on the valve 180 controlling DRIBBLE to DRIP and a 1 signal on the valve 182 controlling DRIP to OFF.

When the NAND gate 146 is closed to inhibit FLOOD, the one-shot multivibrator 174 is triggered so as to hold on the bistable 164 for approximately one second to allow the error signal to settle down to its new level and prevent spurious signals turning off DRIBBLE prematurely. Likewise, one-shot multivibrator 178 protects DRIP when DRIBBLE is inhibited.

As is apparent from the aforegoing description of the level detectors 84,86,92 and 98, when the initial error is greater than 3 Kgm at the commencement of the weighing operation, i.e. the amount to be added to the container exceeds 3 Kgm, the inputs on *a, b, c* and *d* are all 1, and A, B, C and D are held at 1, thus inhibiting none of the gates 146,148, 150. The output B is, however, inverted in the inverter 156 and inhibits the output of the dynamic detector 90 so as to prevent the bistable 164 from being tripped by the dynamic detector 90, the level of which is set for change-over from DRIBBLE to DRIP. The NAND gate 150 is also inhibited by the output of the inverter 156, so preventing the solenoid valve 182 from being energised for DRIP.

Since the change-over "DRIBBLE TO DRIP" and DRIP are both inhibited, it follows that initially the FLOOD condition, initiated by a 0 appearing at the output of the NAND gate 146 prevails; followed by DRIBBLE when this output changes to 1 but with the output of NAND gate 148 still 0; followed by OFF when the NAND gate 148 changes to 1. Thus, in the case where the initial amount to be weighed exceeds 3 Kgm, the valve 124 goes from FLOOD to DRIBBLE to OFF, without passing through DRIP.

If the original amount to be weighed (i.e. the initial error) is less than 3 Kgm but greater than 1 Kgm, then, when weighing is initiated A = 0, B = 1, C = 1 and D = 1. FLOOD is therefore inhibited by the "0" signal applied by A to the gate 146 and the 1 signal which consequently appears on the valve 176. The DRIBBLE condition is therefore initially selected. B inhibits the change from DRIBBLE to DRIP, as before, and the valve 124 thus passes straight to OFF from DRIBBLE without passing through DRIP.

If the initial amount to be weighed (i.e. the initial error) is less than 1 Kgm but greater than 250 gm, then, when weighing is initiated, A = 0, B = 0, C = 1 and D = 1. Since A = 0, the gate 146 is permanently closed so that a 1 is permanently applied to the valve 176 and the DRIBBLE condition is initially selected. The 0 signal from B appearing at an input of the NAND gate 145 prevents the dynamic detector 88, whose trip level is set for DRIBBLE to OFF, from resetting the bistable 164. The inverter 156, however, inverts the signal from B and now allows the dynamic detector 90, set for change-over from DRIBBLE to DRIP, to take effect on bistable 164 via the NAND gate 158.

This inversion also allows the NAND gate 150 to have an initial output of 0 and change to 1 when bistable 166 is reset by the change-over of the dynamic detector 96, set for DRIP to OFF.

It follows from the foregoing description that the valve 124 is controlled by solenoid valves 180 and 182 only. Initially a 0 at the valves 180 and 182 gives an opening corresponding to DRIBBLE by connecting the air line 194 to the source of medium pressure 186. This is followed by a 0 at the valve 182 but 1 at the valve 180 so that the line 194 is then connected to the low pressure source 192.

When the valve becomes 1, the line 194 connects to atmosphere.

Thus, the valve 124 passes through the stages DRIBBLE to DRIP to OFF.

If the initial amount to be weighed (i.e. the initial error) is less than 250 gm but more 40 gm, then, when weighing is initiated, A = 0, B = 0, C = 0, D = 1. Since A and C are both 0, the gates 146 and 148 are both permanently closed so that a 1 is permanently applied to the valves 176 and 180 whereby the DRIP condition is initially selected. Subsequent changing over of the dynamic detector 96 causes a 1 to be applied to the valve 182, resulting in the valve connecting the line 194 to atmosphere and hence selecting OFF.

In the latter cases, therefore, the valve goes from DRIP to OFF.

Finally, in the event that the error is initially less than 40 gm, then A = 0, B = 0, C = 0 and D = 0. In this condition, all three gates 146, 148, 150 are permanently closed and the valves 176, 180 and 182 are therefore all permanently subjected to 1 signals which selects OFF. The 0 on D is also effective to actuate the alarm 183 to indicate a fault condition, since the particular apparatus described is not intended to be capable of dispensing less than 40 gm at any one addition.

The NAND gate 172 ensures that the termination of a satisfactory weighing operation at a given station and the subsequent stepping to the next stage can only occur when a number of conditions have been satisfied.

The NAND gate 172 can only be switched over when all its inputs are 1. This involves there being a 1 on D, and on the outputs of each of the NAND gates 146, 148, 150, as would normally be obtained if the system is operating correctly. It will be observed that when B = 0 (B = 1) i.e. a weighing which does not involve FLOOD, the output from the "wide limits" differential level detector 100 is permanently prevented from being effective to change over the NAND gate 152 whose output therefore remains at 1. However, the inverse signal 1 applied by the inverter 156 to the gate 160 means that until the required tolerance limit is detected by the detector 102, the 1 signal provided by the latter detector turns the gate 160 ON and inhibits the NAND gate 172. On the other hand, when B = 1, i.e. a weighing which involves FLOOD and DRIBBLE but not DRIP, the gate 160 is permanently inhibited by the 0 supplied by the inverter 156 so that a 1 is provided to the gate 172, but the 1 applied to the gate 152 causes this gate to supply a 0 to the gate 172 until such time as the required tolerance limits are detected by the detector 100 and a 0 is applied to the gate 152.

Thus, the detector 102, which is sensitive to narrow limits of tolerance, is only operative on weighings involving DRIP but not FLOOD. The detector 100, which is sensitive to wider limits of tolerance, is, on the other hand, only operative on weighings involving FLOOD or FLOOD and DRIBBLE but not weighings involving DRIP.

Thus, an "end of weigh" signal, which appears as a 0 at the output of gate 172, can only be obtained when FLOOD, DRIBBLE and DRIP have come to an end, no alarm exists, and the error is less than the predetermined tolerance limits. As is apparent from the aforegoing, the acceptable tolerance limits are wider when large amounts are being weighed, i.e. weighings involving FLOOD or FLOOD and DRIBBLE, than when smaller amounts are being weighed, i.e. weighings involving DRIP.

Thus, the above described control system enables the valves 124 at the various stations to be capable of automatically, accurately dispensing the predetermined amounts set by the programme to achieve the required final mixture.

We claim:

1. An automatic weighing machine for weighing out a predetermined quantity of fluid material into a container, including a fluid material valve of the downward delivery type comprising a closure member having a plurality of selectable discrete positions corresponding to different predetermined flow rates through the valve, and a weighing control system which is adapted to control the valve so as to dispense an appropriate weight of fluid material into the container in accordance with a predetermined program, the control system comprising load cell means arranged to provide an electrical output dependent upon the weight of the container plus its contents, and a comparator for comparing the signal from said load cell means with a predetermined target weight to be achieved in accordance with the program to provide an electrical error signal instantaneously representative of the additional weight of fluid material to be dispensed and dynamic detector means responsive to both the magnitude of the instantaneous error and the rate of change of the error for initiating a change in the valve from a positive flow position to OFF in advance of the error reducing to zero.

2. The automatic weighing machine of claim 1 wherein said dynamic detector means comprises a plurality of dynamic detectors which are sensitive to the error falling to different predetermined levels respectively, the detectors providing signals for initiating changes, to different flow rates in accordance with the reduced error, and a plurality of level detectors which detect the initial error at the commencement of a weighing operation, and select a high initial flow rate when the initial error is high but inhibits said high flow rate and selects a lower initial flow rate when the initial error is low.

3. A machine according to claim 1 in which each dynamic detector means comprises a differentiator which receives the error signal, a summing device whose one input receives a preset portion of the output of the differentiator and whose second input also receives the error signal, and a threshold detector whose one input is connected to the output of the summing device and whose other input is connected to a preset potential, the output of the threshold detector providing the dynamic detector output.

4. The automatic weighing machine of claim 1 wherein said weighing control system further comprises a plurality of level detectors which detect the initial error at the commencement of a weighing operation, and select a high initial flow rate when the initial error is high, but inhibits said high flow rate and selects a lower initial flow rate when the initial error is low, and at least one double level detector which provides a control signal when the error has fallen to lie within acceptable tolerance limits, means being provided which inhibit a subsequent weighing operation until such a control signal has been generated.

5. A machine according to claim 4, in which there are at least two of said double level detectors sensitive to different tolerance limits, including a first double level detector which has wide tolerance limits and which is effective when the initial error is high and a relatively large quantity is therefore being weighed, and a second double level detector which has close tolerance limits and which is effective when the initial error is low and a relatively low quantity is therefore being weighed.

6. A machine according to claim 5, further comprising a plurality of pneumatic values controlled by the weighing control system to provide a plurality of different pressure levels for adjusting the closure member of the valve to said different flow rate positions.

7. A machine according to claim 6, in which the valve has four positions corresponding to a high flow rate, an intermediate flow rate, a low flow rate and off, and the weighing control system includes three pneumatic switches, first, second and third pneumatic lines, said third pneumatic line communicating with one side of the piston controlling the position of the valve closure member, a source of high pressure and a source of low pressure, a first of said switches being arranged to selectably connect the first pneumatic line either to the source of high pressure or to the source of intermediate pressure, a second of said switches being arranged to selectably connect the second pneumatic line either to said first line or to the source of low pressure, and the third of said switches being arranged to selectably connect the third pneumatic line either to the second line or to atmosphere.

8. An automatic weighing machine for weighing out a predetermined quantity of fluid material into a container, including a fluid material valve of the downward delivery type comprising a closure member having a plurality of selectable positions corresponding to different flow rates through the valve, the fluid material valve including an annular valve body and a circular sectioned closure member which are relatively displaceable for opening and closing of the valve, the closure member comprising a cylindrical body which is closed at its upper end and which is adapted to be slidably received in a cylindrical bore in the valve body in at least the positions of the closure member corresponding to the intermediate and low flow rate positions, the body of the closure member having at least one vertically extending slot in its peripheral surface for the restricted passage of fluid material in the intermediate and low flow rate positions when said closure member is partially inserted into said bore, the closure member having a lowermost rim of acute angled section and the valve body also having a lowermost rim of acute angled section which forms an annular valve seat, said lowermost rims on the valve seat and closure member being arranged to mate together, when the valve seat and closure member are in their closed position, to define a downwardly directed, sharp, circular composite edge, and a weighing control system which is adapted to control the valve so as to dispense an appropriate weight of fluid material into the container in accordance with a predetermined programme, the control system comprising load cell means arranged to provide an electrical output dependent upon the weight of the container plus its contents, and a comparator for comparing the signal from the load cell means with a predetermined target weight to be achieved in accordance with the programme to provide an electrical error signal instantaneously representative of the additional weight of fluid material to be dispensed, and dynamic detector means responsive to both the magnitude of the instantaneous error and the rate of change of error for initiating a change in the valve from a positive flow position to OFF in advance of the error reducing to zero.

9. The automatic weighing machine of claim 8 wherein said dynamic detector means comprises a differentiator which receives the error signal, a summing device which combines the error signal with at least part of the output of the differentiator, and a threshold detector which compares the output of the summing device with a preset potential to provide an output which changes state to initiate a change in the valve state from a positive flow position to OFF in advance of the error reducing to zero.

10. An automatic weighing machine for weighing out a predetermined quantity of fluid material into a container, including a fluid material valve of the downward delivery type comprising a closure member having a plurality of selectable discreet positions corresponding to different predetermined flow rates through the valve, and a weighing control system which is adapted to control the valve so as to dispense an appropriate weight of fluid material into the container in accordance with a predetermined program, the control system comprising load cell means arranged to provide an electrical output dependent upon the weight of the container plus its contents, and a comparator for comparing the signal from said load cell means with a predetermined target weight to be achieved in accordance with said program to thereby provide an electrical air signal instantaneously representative of the additional weight of fluid material to be dispensed, dynamic detector means responsive to both the magnitude of the instantaneous error and the rate of change of the error for initiating a change in the valve from a positive flow position to OFF in advance of the error reducing to zero, said dynamic detector means including a plurality of dynamic detectors which are sensitive to the error falling to different predetermined levels respectively the detectors providing signals for initiating changes to different flow rates in accordance with the reduced air, a plurality of level detectors which detect the initial error at the commencement of a weighing operation, and select a high initial flow rate when the initial error is high but inhibits said high flow rate and selects a lower initial flow rate when the initial error is low, and at least one double level detector which provides a control signal when the error has fallen to lie within acceptable tolerance limits, means being provided which inhibit a subsequent weighing operation until such a control signal has been generated.

* * * * *